United States Patent [19]
McIlwain et al.

[11] 3,798,453
[45] Mar. 19, 1974

[54] MULTICHANNEL DIGITAL PHOTOMETER

[75] Inventors: Carl E. McIlwain, La Jolla; Edward A. Beaver, San Diego, both of Calif.

[73] Assignee: University of California, San Diego, Calif.

[22] Filed: Aug. 3, 1972

[21] Appl. No.: 277,690

[52] U.S. Cl. ... 250/213 VT, 250/220 M, 313/65 AB
[51] Int. Cl. ............................................. H01j 31/26
[58] Field of Search...... 250/213 VT, 220 M, 211 J; 313/65 AB, 65 T, 65 R, 108 B, 108 D; 346/33 A, 33 B

[56] References Cited
UNITED STATES PATENTS

| | | | |
|---|---|---|---|
| 3,714,439 | 1/1973 | Williams et al. | 250/215 VT X |
| 3,725,751 | 4/1973 | Wakamita | 313/108 D X |
| 3,670,198 | 6/1972 | Lehovec et al. | 314/65 AB X |
| 3,351,763 | 11/1967 | Shuart | 250/220 M X |
| 3,625,122 | 12/1971 | Valdes | 250/213 VT X |

*Primary Examiner*—Walter Stolwein
*Attorney, Agent, or Firm*—Lindenberg, Freilich & Wasserman

[57] ABSTRACT

Apparatus for detecting a weak photon image is disclosed comprised of a magnetically focused image tube having a photocathode at one end, to transform a photon image into an electron image, spaced ring electrodes at progressively lower voltages starting at +20kv, to accelerate electrons to 25 kev, and a linear array of diffused p-n junction diodes for detection of photoelectron arrivals along one line of the electron image. A deflection coil permits scanning the entire photoelectron image, one line at a time. Alternatively, a matrix of p-n junction diodes may be used to detect the entire photoelectron image without scanning.

10 Claims, 6 Drawing Figures

MULTICHANNEL DIGITAL PHOTOMETER

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 245).

BACKGROUND OF THE INVENTION

1. Field of the Invention

This invention relates to a multichannel digital photometer and more particularly to apparatus for detecting a weak photon image, i.e., an image tube for detecting a faint light image.

2. Description of the Prior Art

Most prior art systems for detection of faint light images, such as may be encountered in astronomy and other research areas, involve analog signals read out in such ways that many photons per image element are required to yield a useable output. This seems to be an intrinsic characteristic resulting from the smallness of the electronic charge, i.e., of the low level of energy of the photon. Acceleration of photoelectrons to produce a number of secondary electrons appears to be the only way to get a useable output.

Acceleration of free photoelectrons to a solid with subsequent acceleration of free secondaries to another solid, in discrete stages, as in a photo-multiplier tube (PMT), is one example of the application of the acceleration technique. An array of PMTs could be used to detect or scan a weak photon image. Scanning PMTs have been described by E. J. Wampler, *Ap. J.*, vol. 144, P. 921 (1966), and more recently large PMT arrays have been described by J. B. Oke, *Publications of Astron, Soc. of Pacific*, Vol. 81, No. 478, pp. 11–22 (Feb. 1969). However, there are problems in the use of PMTs for detection of faint light signals in astronomy and othr research areas, such as excessive weight, size and cost.

Another approach which may be used involves acceleration of internal photoelectrons and, in turn, internal secondary electrons to produce an avalanche of current in the avalanch diode. It would have many attractive features, but there are a number of formidable problems. One problem is its production of light, i.e., its operation as a light emitting diode, which could illuminate adjacent diodes in an array.

Still another approach involves acceleration of free-space photoelectrons to an electrode where secondary emissions takes place. Another electrode immediately behind the first functions as a target electrode for the secondary electrons. By providing a first array of parallel emission electrodes and a second array of parallel target electrodes normal to the electrodes of the first array, it is then possible to detect emission of electrons in one elctrode and the collection of electrodes in another (target) electrode. The location of the occurence of emission in response to an incident electron or other particle is then clearly the intersection of the two electrodes involved in the event. Such a detector system is disclosed in a U.S. Pat. No. 3,553,457, using a "channel intensifier" to accelerate the electrons or other particles. This acceleration is necessary to assure enough secondary emissions from the first array to produce detectable pulses on the affected electrodes. Consider a photon striking the input electrode to produce a free electron. First the input electrode must be photoemissive, and second, the "channel intensifier" must accelerate the free electron sufficiently for it to produce a large number of secondary emission electrons. Between the input electrode, which is apparently a plate, and the first array of electrodes is a channel plate having an array of apertures for the electrons or particles to pass to the first array of electrodes. This arrangement would seem to have many problems, such as a short photocathode lifetime due to channel plate in feedback.

OBJECTS AND SUMMARY OF THE INVENTION

An object of this invention is to provide a multichannel digital photometer.

Still another object is to provide apparatus for intensification of faint light signals.

These and other objects of the invention are achieved by a vacuum tube having a wafer of silicon at the back target end and a light sensitive photocathode (such as cesium antiminide) at the front light-incident end. The silicon wafer supports an array of solid state diodes. Each diode is connected in series to an electronic channel comprised of an amplifier, discriminator and digital accumulator for detection of photoelectron arrivals on the target diode. Each diode is also connected to a voltage source to reverse bias it. When an energetic electron enters the depletion region of a reverse biased diode, an electron-hole pair is produced for each 3.5 ev. loss of energy, thus producing a charge packet in the diode. The charge packet thus produced is easily detected. The photon image converted to an electron image at the photocathode is accelerated and focused onto the diode array. Acceleration is achieved by an internal electric field gradient (about 2kv/cm or less) using internal ring electrodes of non-magnetic material. Focusing is by an external magnetic field (in the order of 100 gauss).

DESCRIPTION OF THE PREFERRED EMBODIMENTS

To illustrate the principles of the present invention, an exemplary image tube 10 shown in FIG. 1 will be described in an instrument shown schematically in FIG. 2 for low light level astronomy.

Figure 1:
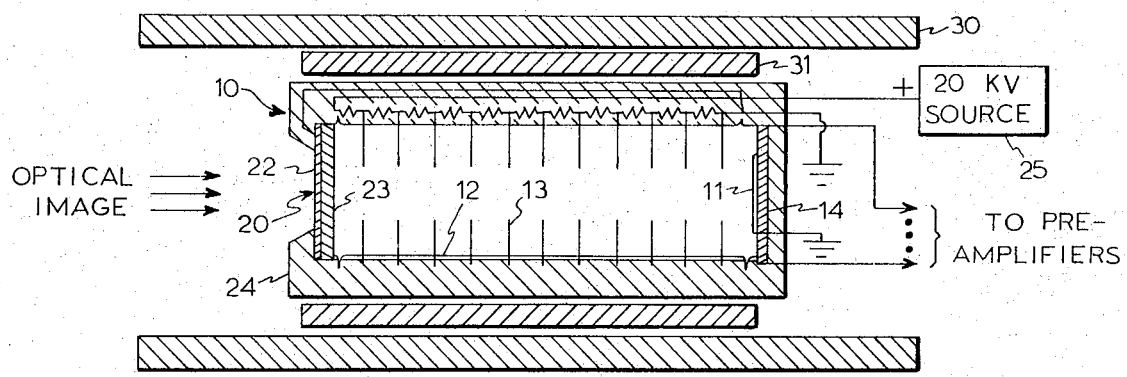
FIG. 1 shows a cross section of an exemplary image tube constructed with p-n junction diodes in accordance with the principles of the present invention.

Referring now to FIG. 1, which shows a cross section of the diode image tube, a diode array panel 11 is placed at one end of a glass (Corning 0080 "lime")

tube 12 having eleven uniformly spaced accelerating ring electrodes, such as a ring 13. In practice, the tube structure is formed by stacking glass rings, with copper discs between the glass rings. Each copper disc is preformed with a 19 mm aperture in the center. Copper is used for the accelerating ring electrodes not only because of its good electrical conduction properties but also because it is non-magnetic, and has good glass sealing characteristics for a vacuum.

The diode array panel is secured to a glass disc 14. In practice, the diode array panel is cold welded to the glass disc in air prior to bake out. The diode array itself is bonded to the panel, a ceramic substrate, by a gold silicon eutectic. The melting point of that eutectic limits the tube's maximum bake-out temperature to about 325°C. The diode leads and common leads are brought out radially beyond the edge of the glass disc 14. Platinum wires of 0.2 mm diameter are used because platinum has a thermal expansion that matches the Corning 0080 glass, and because of its compatibility to the solder glass holding the glass disc to the glass ring on the end of the tube. Additionally, platinum is non-magnetic. In practice, disc-type cold weld pinch-offs are used to secure the glass disc 14 to the end ring of the tube 12.

A significant constraint which the diode array places upon the tube design is the array's high sensitivity to poisoning or contamination by alkali metals which are natural components of most high efficiency photocathodes. Therefore, the array must be carefully protected from exposure to alkali metal during the formation of a photocathode panel 20 at the end of the tube 12 opposite the diode array panel. Also, to obtain a really quiet tube, all the internal electrodes should be free of photoemissive material. This is accomplished by processing the photocathode panel at a remote location while the tube 12 is temporarily closed off at the end. Final sealing of the tube by the photocathode panel is done by a cold weld in a vacuum after bake out of the tube and diode array panel assembly.

The photocathode panel is assembled on a disc 22 of glass (Corning 0080 "lime"). The side of the disc which is to face the diode array is aluminized. Once the photocathode panel is thus assembled, and welded onto the tube 12 in a vacuum, a quartz faceplate 23 with an optically transparent metalization (chromium) is attached to the photocathode panel with an optical cement. The entire assembly is then encapsulated in resin, escept over the center portion of the photocathode panel, to provide a protective jacket 24. Before encapsulating, leads are connected to the accelerating rings, and resistors are connected to the leads between accelerating rings, as shown. Another lead adapted to be connected to a +20kv source 25 is connected to the aluminized side of the photocathode, and to the first accelerating ring through a resistor. The lead connected to the last accelerating ring is adapted to be connected to ground and a lead is connected to the chromium layer on the quartz faceplate to hold the front end of the tube at ground potential. By grounding the tube exposed to the atmosphere, all corona discharge is removed.

This arrangement of resistors connected between the 20kv source and ground provides a resonable internal electric field gradient of about 2kv/cm or less. This assumes the distance from the photocathode panel to the diode array panel is about 15 cm. Thus, for good imaging, the electric field is controlled in a linear fashion by non-magnetic internal ring electrodes while an external magnetic field in the order of 100 gauss is provided by a coil 30 for single loop focusing of the electron image from the photocathode onto the diode array. This accelerating electrode structure shields the electron image stream adequately from the effects of charge accumulation and/or charge generation at the walls of the glass tube.

The photon image converted to a corresponding electron image at the photocathode thus accelerated and focused on the diode array causes internal secondary emissions in the diodes which can be detected. By use of deflection coils 31, the image can be scanned or otherwise positioned on the array for detection.

Figure 2:
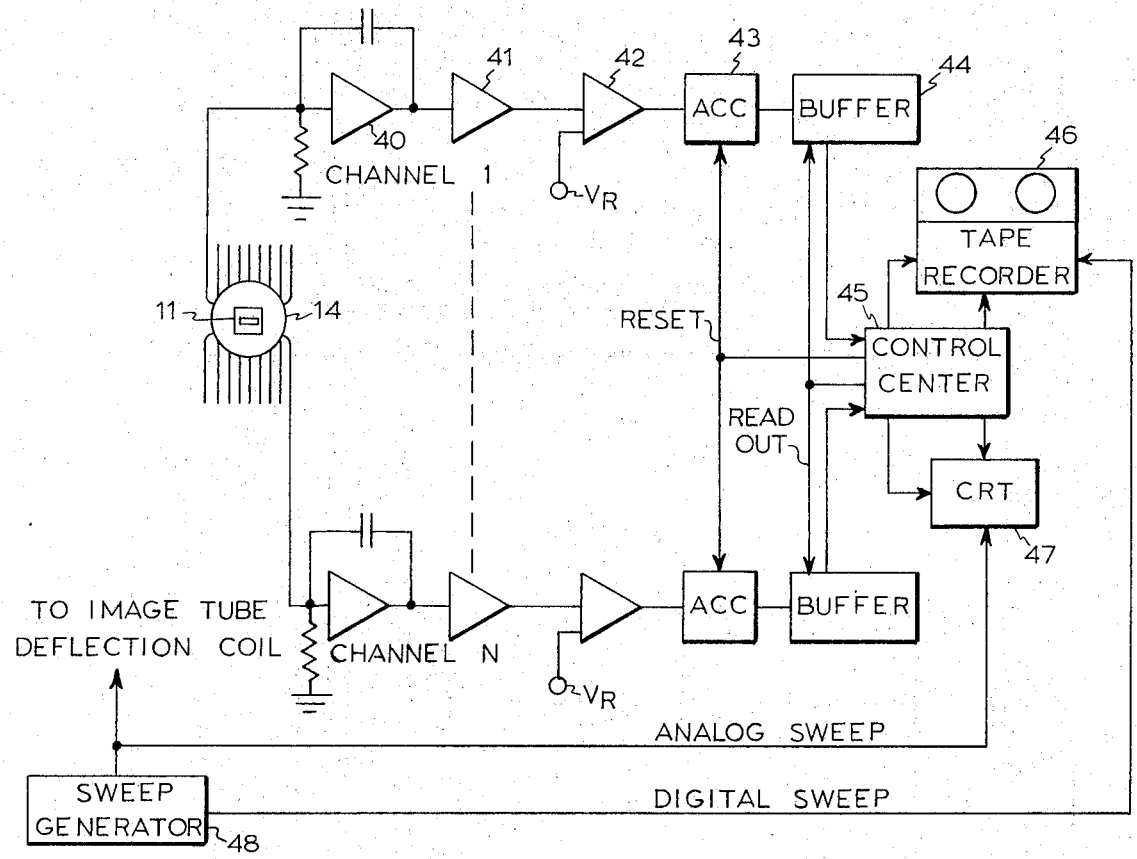
FIG. 2 shows schematically an experimental instrument using an image tube as shown in FIG. 1.

In an experimental instrument shown schematically in FIG. 2, a linear array of 38 silicon planar photodiodes ($p+$ on $n$) is provided, each diode having an active area of 89×89 microns with a shallow diffusion depth of 1 to 2 microns. A readily detectable charge pulse is obtained on the output lead of a given diode for each bombarding electron having an incident energy in the order of 15 to 30 thousand electron volts.

The integration or counting of photoelectrons with semiconductor diode detectors requires low noise, high gain electronics. A schematic diagram for the instrument is shown in FIG. 2. For this exemplary embodiment, each diode element has a single circuit channel for simultaneous detection of photoelectrons with N diode elements. In any embodiment there are two possible approaches: eight integration of the channels on the silicon chip of the diode array up to a memory element, with sequential readout of the N channels or N individual wires out of the image tube to exterior channels. For an experimental instrument, the second approach has the advantage of permitting changes in the circuits. For large scale production, however, the first approach has all of the advantages of integrated circuits, although care must then be taken to assure that only the diodes are affected by the impinging electron image.

Each diode lead is connected to a separate channel. When an energetic electron enters the depletion region of a reverse biased diode, an electron-hole pair is produced for each 3.5 ev loss of energy; an electron losing 16 kev in the depletion region thus generates a charge packet of about $7.3 \times 10^{-16}$ coulombs. The advent of low noise field-effect transistors has made it possible to easily detect this charge packet.

All of the channels 1 to N are alike, so only the first will be described. An amplifier 40 having a low noise field-effect transistor at its input stage and capacitive feedback is provided as a charge sensitive preamplifier to produce a pulse at its output for each charge packet appearing at its input. For a practical system with N greater than 10, a small size, low cost, low power and low noise preamplifier is desired.

A high gain voltage amplifier 41 amplifies each pulse produced by the preamplifier when an electron impinges the channel diode. A pulse detector 42, in the form of a differential amplifier, transmits only pulses having an amplitude greater than a reference voltage $V_R$ (which is set for maximum noise rejection without too much sacrifice in instrument sensitivity, i.e., set for optimum signal-to-noise ratio). The pulses thus detected are accumulated in a digital (16-bit) accumulator 43. Periodically, the content of the accumulator is transferred into a buffer register 44 by a control center (programmed digital computer or the like) 45. At the same time, the accumulator is reset. This permits the control center to read out the contents of the buffers in series for recording in a tape (punched or magnetic) recorder for later display and analysis or for display on a cathode ray tube (CRT) 47 and immediate analysis. This permits the accumulator to count pulses uninterrupted except for periodic resets.

At the end of any period, the number transferred into the buffer register is proportional to the intensity of the light image at a particular point. If the numbers thus produced are used to modulate the intensity of the CRT, a light image can be reproduced corresponding to that being viewed through the tube 10.

With a linear array of diodes, only one line of the image can be thus reproduced on the CRT at a time. However, with a sweep generator 48, which produces a step wave in response to reset pulses from the control center 45, it is possible to deflect the electron image progressively to permit many uniformly spaced lines of the image to be viewed in sequence and displayed side by side due to the persistence of the CRT. A simple counter, digital-to-analog converter and amplifier would suffice for the sweep generator. The digital output of the counter could then be transmitted to the tape recorder 46 for recording on a separate channel. At the same time the deflection signal for the tube 10 could be applied to the CRT. Thus, as each reset dumps the contents of the accumulators into their respective buffers, the deflection coils of the tube 10 and the CRT 47 are stepped one line space down. Then as the line data just stored is read out, the electron beam of the CRT is stepped one diode space across. When a given number of lines have been displayed to complete a frame of data, the counter in the sweep generator automatically recycles to repeat the frame. The result is a television like display of a faint light image that can be made more intense by simply turning up the video signal gain of the CRT. For very weak signals it is possible to sum data from a number of frames in sequence and produce a time integrated image.

Instead of scanning the electron image across a linear diode array, it would be feasible to employ a rectangular array, thus requiring only a focus coil for the image tube. Electronic switching techniques could then be used to read out one line at a time as before for storage or display and analysis. Alternatively, a matrix approach may be used to read out from $N^2$ diodes through 2N leads as will be described more fully hereinafter. The N channels shown in FIG. 2 could then be used to read out all diodes one at a time, row by row. That could be accomplished by a separate connection for each row through a selection switch. The $i$-th diode of each row would then be connected through a common lead to the $i$-th read out channel. The techniques for producing such a matrix would not be significantly different than that to be described for a linear array; only the "art work" in the integrated-circuit techniques used would be different.

Figure 3:
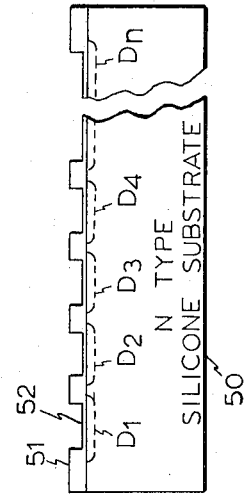
FIG. 3 shows schematically a sectional view of a linear diode array.

The technique for producing a linear array will now be described with reference to FIGS. 3 and 4. As noted, the diode array is formed by integrated-circuit techniques from a single chip of silicon. The technique is in three general steps starting with an n-type silicon substrate 50. A silicon dioxide layer 51 is first produced on the substrate. This layer is then etched to expose the substrate in the desired pattern. The p-n junction diodes $D_1$ to $D_n$ are formed by diffusing a p-type impurity (Boron) through the etched openings in the $SiO_2$ layer. A passivation layer 52 of $SiO_2$ is produced over the etched openings to protect the diode junctions from alkali metals as part of this step. This is important because such metals cause reduction in the reverse bias breakdown voltage and an increase in the reverse bias current if permitted to migrate into the diodes.

Figure 4:
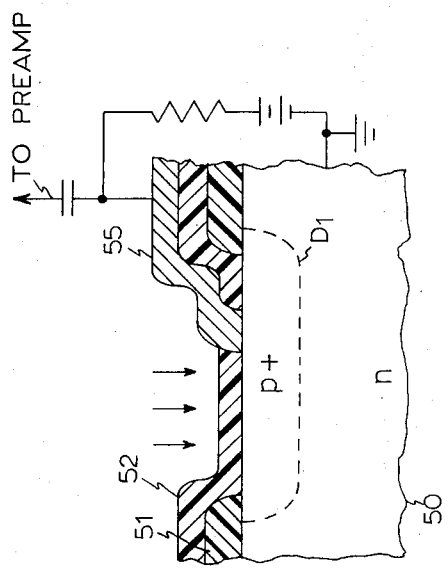
FIG. 4 shows schematically a sectional view of one diode of the array of FIG. 3 with a metallized overlay.

Once the array of diodes has been formed, the leads to the individual diodes, such as a lead 55 to diode $D_1$ shown in FIG. 4, are formed by a conventional metallizing sequence consisting of etching a contact opening over each diode. Then the desired ohmic contacts are formed with the diodes by vapor depositing aluminum metal over the openings. A pattern of leads is vapor deposited as part of this step, and the metal is alloyed into the surface of the p-type silicon by heating above the eutectic temperature of the alloy thus formed. This technique of forming ohmic contacts and extensions of the ohmic contact over the oxide as circuit leads is commonly known as "overlay metallizing."

As noted hereinbefore, platinum wires are used as leads from the diode array panel to the outside of the image tube. This is done by spot welding platinum wires to the ceramic substrate to which the diode array thus formed is bonded by a gold silicon eutectic. The connections of these leads to the diodes are then completed by ultrasonically bonding aluminum wires from the spot welds of the platinum wires to the metalized overlay pattern of the diode array.

The $p^+$ silicon over the n-type substrate causes formation of a sensitive volume of silicon known as a depletion region. Application of an external bias voltage as shown in FIG. 4 extends this region. For the bulk resistance of 100 ohms-cm in the silicon substrate, a 10 volt reverse bias causes formation of a depletion depth of 18 microns. Since 20 kev electrons penetrate about 4 microns into the p-type silicon, all electron-hole pairs are produced in the sensitive depletion region, neglecting any entrance dead layer. At the electron-hole production rate of 3.5 ev/e-h pair, a 20 kev electron produces an average 5.7 ($10^3$) electron-hole pairs. In about $10^{-8}$ sec, the charge is swept out of the depletion region and in this embodiment detected as a charge pulse by the amplifier-discriminator circuit of the read-out channel. In other embodiments, the charge packet may be stored for sequential read out.

Figure 5:
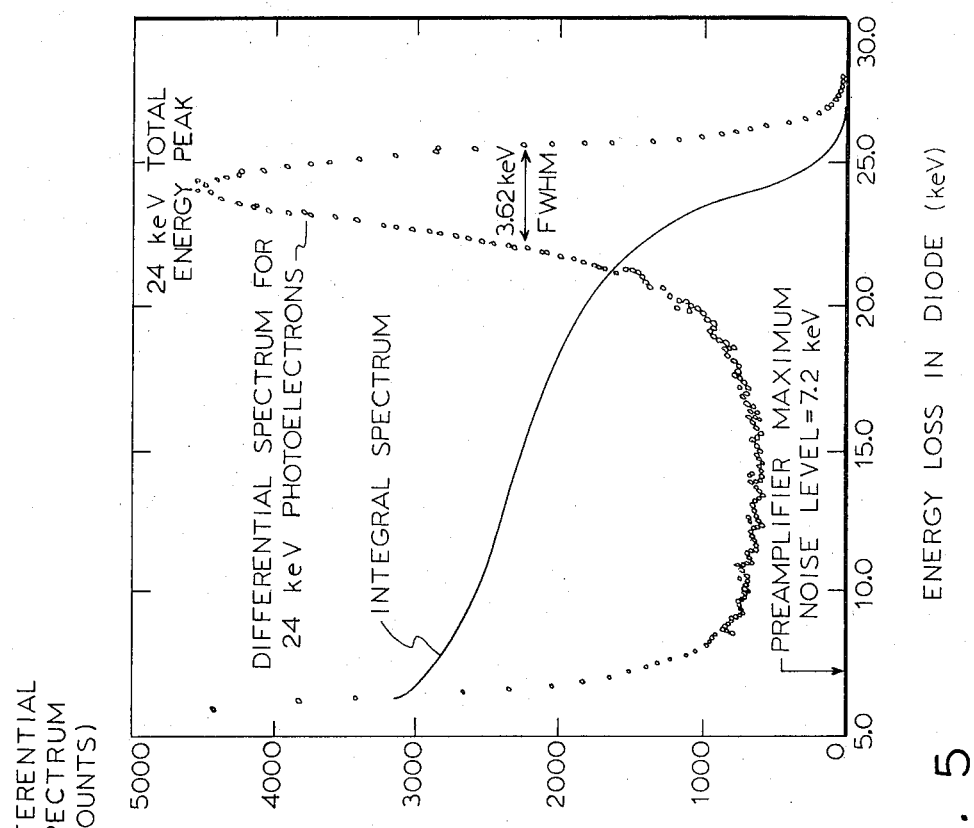
FIG. 5 shows a pulse-height spectrum from 24 kev incident photoelectrons on a silicon p-n junction diode with a preamplifier having a high input impedance.

FIG. 5 is a pulse height spectrum from 24 kev incident photoelectrons on a semiconductor element with a high-gain preamplifier having a high input impedance, such as a source-follower FET input stage of a two stage amplifier. By placing a discriminator level at approximately 10 kev, 80 percent of the incident photoelectrons can be counted with negligible electronic background noise. The differential spectrum (for 24 kev photoelectrons) of FIG. 5 can be divided in three sections:

1. the 0 – 7 kev region due to preamplifier noise;
2. the total energy peak at 24 kev which results from complete energy loss of photoelectrons in the diode element; and
3. the region between 7 and 24 kev, which shows only partial energy loss for electrons backscattered from the detector.

The integral spectrum of FIG. 5 indicated by a solid line demonstrates the inherent stability of this pulse counting approach.

The performance of the image tube has been detailed in Rev. Sci. Instr., Vol. 42, p. 1321 (Sept. 1971). A summary of those results is as follows:

1. The dark current is mainly thermionic, resulting in .01 count/sec/diode element.
2. The detective quantum efficiency (Q.E.) is 4.1 percent at 4,000 A., although a new replacement tube exhibits 20 percent Q.E..
3. If a spot is projected on one diode, about 1 percent of the signal leaks into the adjacent diode.
4. When a uniform light source is projected onto the photocathode, there is a ±3 percent variation in diode response. This is a combined effect of photocathode spatial variation, diode sensitivity variation, and different electronic discriminator settings.
5. Tube optimum operating voltage is 22,000 volts.

Figure 6:
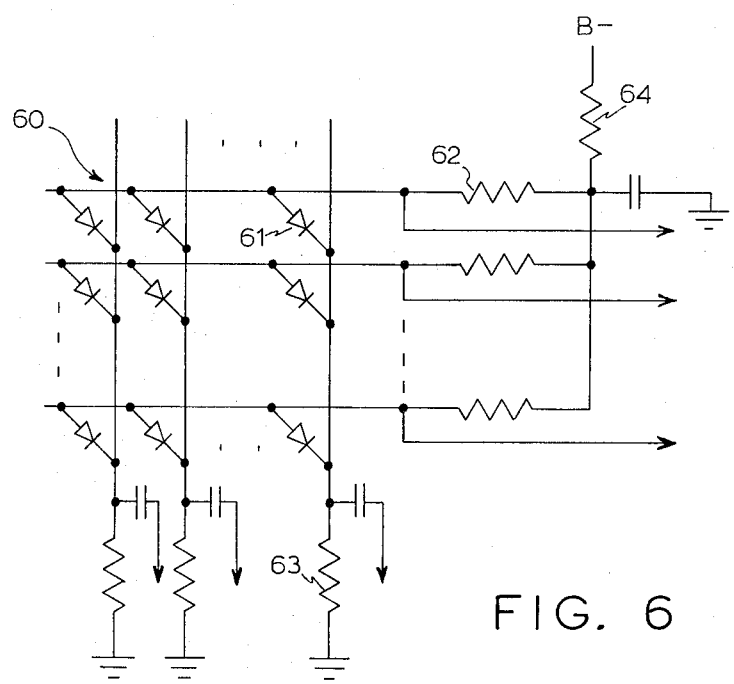
FIG. 6 illustrates diagrammatically a rectangular array of p-n diodes connected between intersections of lines arranged in rows and columns.

FIG. 6 illustrates diagrammatically a rectangular array 60 of p-n diodes connected between intersections of lines arranged in rows and columns. The electron image focused onto the array will produce coincident pulses between orthogonal lines to indicate the position of impact of the photoelectrons. Consider a photoelectron impinging on a diode 61 at the intersection of the first row and the last column. Coincident pulses across bias resistors ($\approx$ 50 megohm) 62 and 63 will uniquely define the diode impinged. A smaller resistor ($\approx$ 1 megohm) 64 may be used to connect the power supply to all bias resistors for the rows of the array. The coincident pulses thus produced are capacitively coupled into a logic network (not shown) which will produce a single pulse for that diode location. The single pulse may then be integrated digitally with other pulses for the same diode location. In that manner the entire photoelectron image is looked at to obviate the need for scanning.

It is evident that the array can be as large, or small, as desired for a particular application. The array may even be reduced to a single diode to be used as a replacement for a photomultiplier tube. It is also evident that the photoelectron image may be focused by any suitable means, namely magnetic or electrostatic means. The image may even be proximity focused by placing the diode or diodes at the optimum location in the electrostatic accelerating field, particularly in the case of a single diode. In each case, the number of photoelectrons received by a given diode over a specified period may be counted by digital integration techniques to enhance the detection of a weak photon image.

Although particular embodiments of the invention have been described and illustrated herein, it is recognized that modifications and variations may readily occur to those skilled in the art. It is therefore intended that the claims be interpreted to cover such modifications and variations.

What is claimed is:

1. Apparatus for detecting a weak photon image comprised of a vacuum tube of non-conductive material having: a photocathode at one end for receiving photons from outside said tube and transforming them into free photoelectrons inside said tube, an array of solid-state diodes at the other end of said tube for receiving said photoelectrons, means for reverse biasing each of said diodes, means for accelerating sqid photoelectrons, means for imaging said photoelectrons on said array of diodes where each of said photoelectrons produces a large number of electron-hole pairs resulting in a packet of charge deposited on one of said diodes, and electronic means for detecting separately any packet of charge deposited on each one of said diodes.

2. Apparatus as defined in claim 1 wherein said imaging means is comprised of means for focusing onto a plane of said array a photon image produced in said tube by said photocathode in response to a light image.

3. Apparatus as defined in claim 1 wherein said accelerating means is comprised of ring electrodes of non-magnetic material spaced between said photocathode and said array of diodes, and means for biasing said electrodes at progressively lower potential from said photocathode to said plane of said array of diodes to provide an internal electric field gradient.

4 Apparatus as defined in claim 3 wherein said array of diodes is comprised of a plurality of diffused junction diodes disposed in said plane, and each diode is comprised of a region of diffused impurities in a common substrate of semiconductive material.

5. Apparatus as defined in claim 4 wherein said diodes are disposed in a linear array, said imaging means including deflection means for selectively deflecting said photoelectron image in said tube, whereby said image can be scanned.

6. Apparatus as defined in claim 4 wherein said diodes are disposed in a rectangular array to detect said photoelectron image in said tube without need for selectively deflecting said photoelectron image in said tube.

7. Apparatus as defined in claim 6 wherein diodes of said rectangular array are connected at their anodes in groups to a first plurality of parallel conductors, one group connected to a unique one of said conductors, and wherein diodes of said rectangular array are connected at their cathodes in groups to a second plurality of conductors orthogonal to said first plurality of conductors, one group connected to a unique one of said conductors, each group selected for connection to one of said second plurality of conductors having only one diode in common with a group selected for connection to one of said first plurality of conductors, whereby a packet of charge produced on one diode of an array indicates the arrival of a photoelectron on said plane of said array of diodes at the location of said diode, and said location is uniquely defined by simultaneous conduction of current by two orthogonal conductors.

8. Apparatus as defined in claim 4, including a plurality of deflection means, each diode being connected to a different one of said detection means for detecting each packet of charge produced in response to a photoelectron.

9. Apparatus as defined in claim 8 including a plurality of digital accumulating means, wherein each detecting means is connected to separate accumulating means for counting packets of charges detected, whereby intensity of said weak photon image may be increased by counting packets of charges over a period of time.

10. Apparatus as defined in claim 9 including a plurality of buffer means, one buffer means for each accumulating means connected to receive the contents thereof when reset, and means for periodically resetting said accumulating means, thereby permitting readout of accumulated packets while the next accumulation is taking place.

* * * * *

UNITED STATES PATENT OFFICE
CERTIFICATE OF CORRECTION

Patent No. 3,798,453             Dated March 19, 1974

Inventor(s) Carl E. McIlwain and Edward A. Beaver

It is certified that error appears in the above-identified patent and that said Letters Patent are hereby corrected as shown below:

| | | |
|---|---|---|
| Abstract, line 6 | - | "+20kv" should read -- -20kv --. |
| Column 3, line 54 | - | "+20kv" should read -- -20kv --. |
| Column 4, line 31 | - | "eight" should read -- either --. |
| Column 8, line 2 | - | "sqid" should read -- said --. |
| Column 8, line 51 | - | "deflection" should read -- detection --. |
| Figure 1 | - | The plus (+) sign for the 20kv source 25 should be a negative (-) sign. |

Signed and sealed this 10th day of December 1974.

(SEAL)
Attest:

McCOY M. GIBSON JR.               C. MARSHALL DANN
Attesting Officer                 Commissioner of Patents